(12) United States Patent
Kim

(10) Patent No.: US 8,184,009 B1
(45) Date of Patent: *May 22, 2012

(54) HUMIDITY-SENSITIVE CUTOFF FUSE

(75) Inventor: Yoonkee Kim, Freehold, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/068,464

(22) Filed: May 10, 2011

(51) Int. Cl.
*G08B 21/00* (2006.01)

(52) U.S. Cl. ..... 340/602; 340/500; 340/540; 340/572.1; 340/584; 310/307; 310/332

(58) Field of Classification Search .... 340/572.1–572.9, 340/602, 500, 540, 584; 338/13; 310/307, 310/332; 337/36, 75, 139, 70; 235/375–385
See application file for complete search history.

(56) References Cited

U.S. PATENT DOCUMENTS

| | | | | |
|---|---|---|---|---|
| 5,909,078 A * | 6/1999 | Wood et al. | | 310/307 |
| 6,114,794 A * | 9/2000 | Dhuler et al. | | 310/307 |
| 7,239,064 B1 * | 7/2007 | Jenkins et al. | | 310/307 |
| 7,619,346 B2 * | 11/2009 | Yazdi | | 310/307 |
| 7,956,759 B1 * | 6/2011 | Kim | | 340/602 |
| 2005/0009197 A1 * | 1/2005 | Adams et al. | | 436/164 |
| 2007/0024410 A1 * | 2/2007 | Yazdi | | 338/13 |

* cited by examiner

*Primary Examiner* — Hoi Lau
(74) *Attorney, Agent, or Firm* — Michael Zelenka; Stephen J. Harbulak

(57) ABSTRACT

A humidity-sensitive cutoff fuse RFID tag is provided with a bimorph element and thin conductive bridges positioned on an RFID tag substrate that can react to all changes in storage humidity conditions. The bimorph element is configured and positioned so that when it bends in response to one or more predetermined humidity levels, the bimorph element will break one of the conductive bridges and cause an open circuit that can be detected when the RFID tag is interrogated by a sensor. The humidity-sensitive cutoff fuse RFID tag can provide humidity information about numerous stored objects such as food, medicine, chemicals, batteries, explosives and munitions. Multiple humidity conductive bridge cutoff fuse RFID tag arrangements and methods for notifying the user when a predetermined storage humidity limit has been reached with a passive humidity-sensitive cutoff fuse RFID tag are provided. Since it does not require power to operate, the cutoff fuse is suitable for monitoring a long-term storage condition.

20 Claims, 4 Drawing Sheets

HUMIDITY-SENSITIVE CUTOFF FUSE

GOVERNMENT INTEREST

The invention described herein may be manufactured, used, imported, sold, and licensed by or for the Government of the United States of America without the payment to me of any royalty thereon.

RELATED APPLICATION

"Thermal Cutoff Fuse For Arbitrary Temperatures," which has been filed with the U.S. Patent And Trademark Office, is designated as U.S. patent Ser. No. 12/079,085, has been assigned to the same assignee and is related to this application.

FIELD OF THE INVENTION

The present invention relates to radio frequency identification devices. More particularly, the present invention relates to radio frequency identification devices with a cutoff fuse triggered by excessive humidity.

BACKGROUND OF THE INVENTION

Inventory control for long-term storage items has become an increasingly important field of endeavor. One particularly noteworthy aspect of inventory control is environmental control of the storage location, whether the commodities are stored in a depot, warehouse or retail establishment. One parameter that should be monitored during long-term storage is humidity, because such changes in humidity can have drastic and long-reaching impact on many different commodities. If the proper humidity range for the stored object is not maintained during storage, the useful lifetime, capability, safety, and other characteristics of the stored object can be deleteriously degraded or lost, which can lead to a number of undesirable, and possibly dangerous, results.

For monitoring a long-term storage condition, it is a disadvantage for any humidity monitor to require a battery power source, because any battery has a finite useful life over a certain period of time. Therefore, it is essential that a long-term humidity monitor must operate without battery power.

One type of prior art humidity monitor that does not require electrical power is the dial hygrometer. FIG. 1 is a perspective view of a prior art dial hygrometer with a needle that moves in response to changes in humidity, which is set against a clock-type face. While the prior art dial hygrometer is useful for indicating current humidity through movement of the needle, it does not record the history of humidity changes during storage. The inability of the prior art dial hygrometer to record the history of humidity changes during storage is a key disadvantage of this device. Thus, there has been a long-felt need for a real-time humidity monitor that can also record humidity change history.

Radio Frequency Identification (RFID) is an emerging area of technology with numerous applications, particularly in the field of inventory control. RFID is an automatic identification method, relying on storing and remotely retrieving data using devices that are called RFID tags or transponders. An RFID tag is a small object that can be attached to, or incorporated into, a product, animal, person or other stored object and contains silicon chips and antennas to enable it to receive and respond to radio-frequency queries from an RFID transceiver. When an RFID tag is combined with one or more sensors, the RFID tag can report the information that is measured by the sensors. A passive RFID tag requires no internal power source, while active RFID tags do require a power source. A passive RFID tag is better for inventory control for long-term storage items because the use of battery power to operate the RFID tag is ordinarily unacceptable. In the RFID arrangement, the device receives electrical power from the RF when it is being read, therefore for such applications, a passive RFID tag combined with a sensor that also does not need power for its operation is critical. However, there is no currently available RFID tag that can effectively monitor changes in humidity. Thus there has been a long-felt need for a humidity monitor using RFID technology that not only responds to changes in humidity but can also provide a real-time record of those humidity changes. Up until now, the long-felt need for an all-humidity-sensitive RFID tag has not been met.

SUMMARY OF THE INVENTION

In order to answer the long-felt need for a humidity-sensitive RFID tag, the present invention provides an RFID tag with a humidity cutoff fuse that causes a detectable open circuit when a required storage humidity level, or range, has not been maintained, as well as a record of humidity changes that occurred in the storage facility. The present invention provides a humidity cutoff fuse advantageously positioned on an RFID tag that cuts off at predetermined humidity levels, either high or low, or both. This invention's humidity cutoff fuse RFID tag advantageously configures a bimorph element and thin conductive bridges positioned on an RFID tag to react to storage humidity changes so that the bimorph element will bend and break one of the conductive bridges and cause an open circuit that can be detected by a sensor.

Accordingly, it is an object of the present invention to provide a humidity-sensitive RFID tag.

Another object of the present invention is to provide a passive humidity-sensitive RFID tag with a cutoff fuse that notifies the user when required storage humidity has not been maintained.

It is also an object of the present invention to provide a passive humidity-sensitive cutoff fuse RFID tag comprising a bimorph element and thin conductive bridges that react to changes in storage humidity conditions that can be detected when the RFID tag is interrogated and provide a record of the humidity changes.

It is still a further object of this invention to provide a method of notifying the user when predetermined high or low storage humidity level has been exceeded with a passive humidity sensitive RFID tag as well as a record of humidity changes in the storage facility.

These and other objects and advantages can now be attained by this invention's humidity-sensitive cutoff fuse RFID tag comprising a bimorph element and thin conductive bridges that can react to all changes in storage humidity conditions and cause one or more open circuits that can be detected when a sensor interrogates the RFID tag. A bimorph is a cantilever having two active layers that produce a displacement through humidity activation, which is a humidity change that causes one layer to expand more than the other layer. In accordance with the present invention, the bimorph element is configured and positioned so that when it bends in response to one or more predetermined humidity levels, the bimorph element will break one of the conductive bridges and cause an open circuit that can be detected when the RFID tag is interrogated by a sensor. The bimorph will bend in response to a humidity change at a fixed temperature. This invention's humidity-sensitive cutoff fuse RFID tag could be advantageously used to provide minimum and maximum humidity information about numerous stored objects such as food, medicine, chemicals, and so on. The present invention also has numerous applications for military purposes as well, to provide humidity information for stored objects such as rations, medicines, and batteries, and most particularly for explosives and munitions, which can lose their effectiveness or become dangerous if exposed to conditions exceeding a safe humidity range during storage. The present invention provides different multiple humidity conductive bridge cutoff fuse RFID tag arrangements and methods for notifying the user when a required storage humidity has been reached with a humidity sensitive RFID tag. This multiple humidity cut-off fuse embodiment could provide a record of minimum and maximum humidity changes by reading which fuses have been cut or not.

DETAILED DESCRIPTION OF THE DRAWINGS

Figure 1:
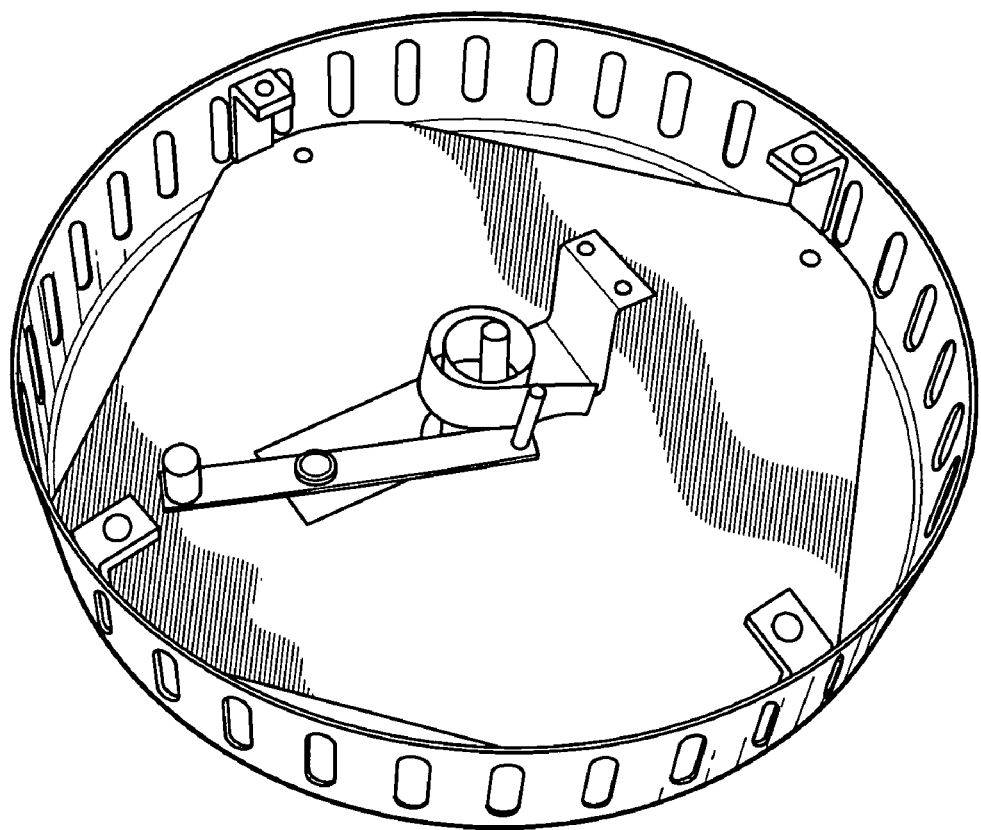
FIG. 1 is a perspective view of a prior art dial hygrometer.
Figure 2:
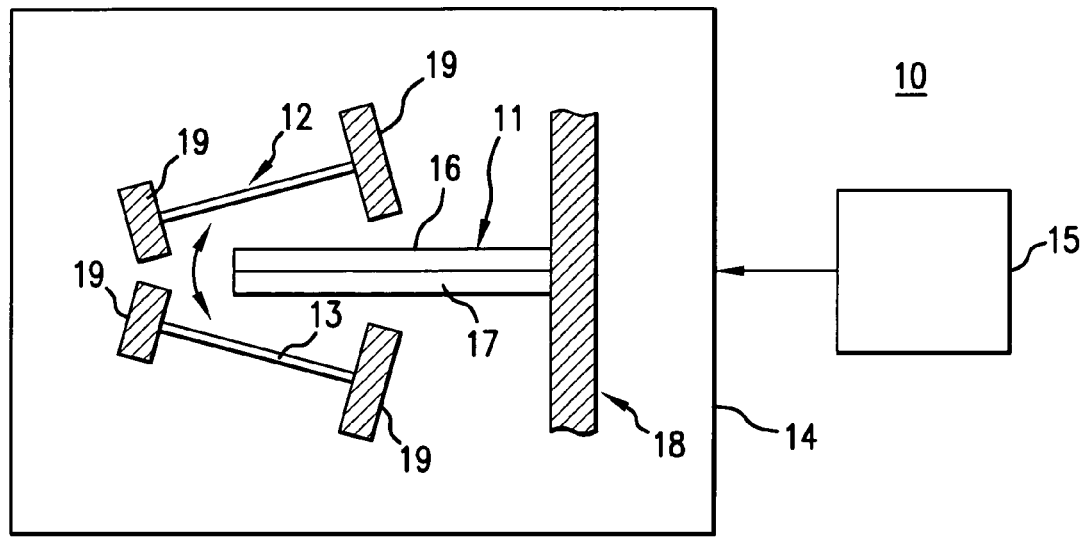
FIG. 2 is a top conceptual view of a simplified humidity-sensitive cutoff fuse RFID tag of the present invention.

The present invention is a passive humidity-sensitive cutoff fuse RFID tag that reacts to all changes in storage humidity and can be interrogated by a sensor in the vicinity. Referring now to the drawings, FIG. 2 depicts a top conceptual view of a simplified version of this invention's humidity-sensitive cutoff fuse RFID tag 10, comprising a bimorph strip 11 and thin conductive bridges 12 and 13 positioned on a tag substrate 14. The tag 10 is deployed in proximity to a stored object and a sensor 15.

The bimorph strip 11 further comprises two active layers 16 and 17 that produce a displacement through humidity activation, which is a humidity change that causes one layer to expand more than the other layer. This invention's bimorph strip 11 converts a storage humidity change into mechanical displacement because of the difference in the coefficients of humidity expansion of the two materials, such as a material with a small humidity expansion coefficient in layer 16 and a different material with a large humidity expansion coefficient in layer 17 so that a flat strip bends toward layer 16 when humidity increases, and in the opposite direction toward layer 17 when humidity decreases below a predetermined level. In operation, the bimorph strip 11 reacts to changes in storage humidity conditions and will cause a detectable open circuit. This invention's bimorph strip 11 is held in place on tag substrate 14 by a bimorph support arm 18. The thin conductive bridges 12 and 13 are constructed so that they can be broken easily by the bending the bimorph strip 11, but strong enough to withstand ordinary handling.

Each of the thin conductive bridges 12 and 13 are connected to a pair of flexible bridge support members 19 and a conductive bridge fuse circuit 20. In operation, the bimorph strip 11 is configured and positioned on the tag substrate 14 so that when it bends in response to a predetermined humidity it breaks one of the conductive bridges 12 and 13 to open the conductive bridge fuse circuit 20. Thus when RFID tag 10 is interrogated by sensor 15, the RFID tag 10 will indicate the shorted or open status of the conductive bridge fuse circuit 20. The simplified version of this invention would be unable to provide a historical record of humidity changes by itself because it only uses high and low humidity conductive bridges. In order to generate a historical record of humidity changes with this simplified version, it would be necessary to connect the sensor to a means for data processing. Instead of connecting a data processing means to the sensor, the preferred technique for recording humidity changes in accordance with this invention would be to use multiple conductive bridges and then determine which of the conductive bridges had been broken. Other embodiments of this invention advantageously employ multiple conductive bridges that will provide the necessary information.

Numerous variations of this invention's humidity-sensitive cutoff fuse RFID tag 10 are possible, including thickness and configuration of the conductive bridges 12 and 13 and composition of the bimorph strip 11. It is noted that the bimorph bends in response to a humidity change at a fixed temperature. However, since the bimorph utilizes two different materials, the bimorph may also react to a temperature change. For this reason, a proper selection of the bimorph materials is needed such that the bending due to a temperature change over an operating temperature range will not cause the fuses to break. Another way to differentiate humidity-induced bending from temperature-induced bending would be to combine the humidity monitor with another device that responds to temperature changes such as the devices disclosed in the related patent application designated as U.S. patent Ser. No. 12/079,085. Another variable factor is the number of conductive bridges. The conductive bridges 12 and 13 can be as thin as a few tens of micrometers or otherwise comparable to the size of microelectronic circuits so long as they can be easily broken by the bimorph strip 11, survive normal handling shock and be manufactured with microelectronic fabrication techniques. Additionally, the bimorph strip 11 can be composed of numerous different materials, including metals, so long as the difference in the coefficients of humidity expansion between the two materials is adequate and the materials survive operational contraction and expansion. Although this invention is most concerned with monitoring excessive absolute humidity, this invention's humidity-sensitive cutoff fuse can be configured to monitor absolute humidity, relative humidity or both.

Figure 3:
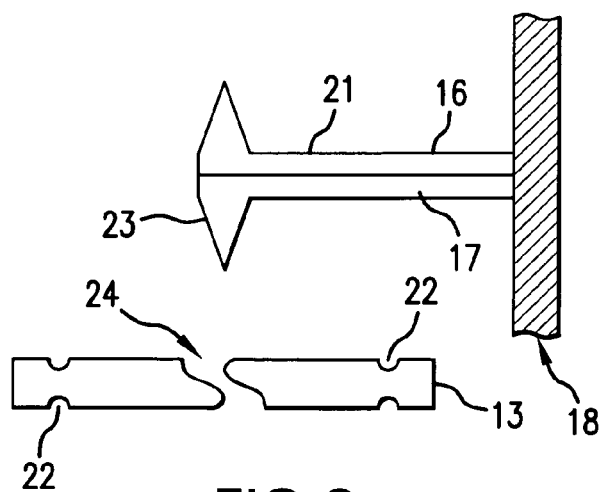
FIG. 3 is an enlarged side view of a modified bimorph strip and a notched conductive bridge in accordance with the present invention.

Referring now to FIG. 3 which uses the same numerals for like structural elements, there is depicted an enlarged side view of a modified bimorph element 21, conductive bridge 13 and bimorph support arm 18. In this case, the conductive bridge 13 has been configured with multiple notches 22 in order to provide easy breakage of the conductive bridge fuse circuit 20 in accordance with the present invention. The modified bimorph element 21 includes a sharpened edge 23 in order to more efficiently break the conductive bridge 13 and generate a breach 24 in the conductive bridge 13 and a detectable open circuit.

Although FIG. 2 illustrates at least two conductive bridges, the number of conductive bridges will usually be varied according to the number of desired humidity set points and in most applications, multiple conductive bridges will be used to provide a record of humidity changes. In some cases it may be desired for the stored object and storage facility to require only that the fuse cuts off at a single humidity set point, and then only one conductive bridge is needed. The humidity-sensitive cutoff fuse RFID tag depicted in FIGS. 4-6 can be triggered at multiple humidity set points to provide a record of humidity changes, so that in most cases, multiple conductive bridges 12 and 13 will be effectively used.

Figure 4:
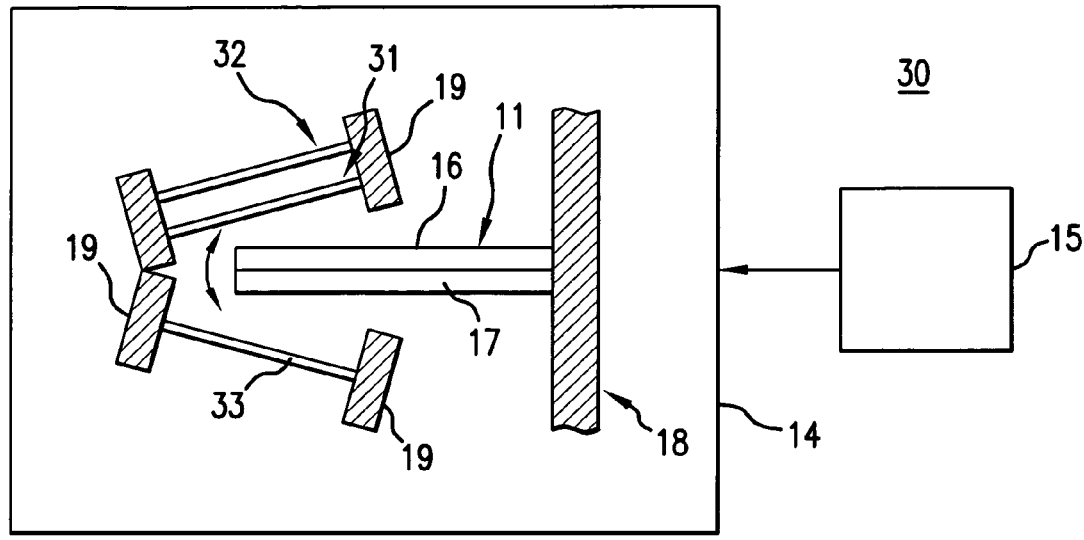
FIG. 4 is a top conceptual view of the humidity-sensitive cutoff fuse RFID tag with multiple conductive bridges for multiple humidity settings.

The present invention also encompasses a number of different embodiments and configurations of the passive humidity-sensitive cutoff fuse RFID tag. To have more set points, more conductive bridges can be added as shown in FIG. 4. In accordance with the present invention, the fuse cutoff set point is decided by the distance between the conductive bridges and the bimorph strip 11. Suppose that the bimorph strip 11 bends toward the upper direction when the humidity increases. As humidity increases, the first conductive bridge 31 breaks, and if the humidity goes even higher, the next conductive bridge 32 breaks. Thus, the RFID tag circuit can read the open circuit so that the excursion of the humidity during the storage can be read when the RFID tag is interrogated.

Referring now to the drawings, and using the same numerals for like structural elements, FIG. 4 illustrates a top conceptual view of the multiple set-point humidity-sensitive cutoff fuse RFID tag 30, comprising a bimorph strip 11, first top conductive bridge 31, second top conductive bridge 32, and lower conductive bridge 33. As is the case in all embodiments, the thin conductive bridges 31, 32 and 33 are constructed so that they can be broken easily by the bending of the bimorph strip 11 in response to predetermined changed storage humidity levels, but strong enough to withstand ordinary handling. Each of the thin conductive bridges 31, 32 and 33 are connected to a pair of flexible bridge support members 19 and a conductive bridge fuse circuit 20, but for the sake of simplicity, the wiring for the circuit 20 is not shown in this drawing and the remaining ones.

Another embodiment of the present invention is to fabricate the humidity-sensitive cutoff fuse RFID tag at a very low cost with Micro-Electro-Mechanical Systems (MEMS) technology. MEMS technology permits the integration of mechanical elements, sensors, actuators, and electronics on a common silicon substrate through micro-fabrication techniques. The electronics are fabricated using integrated circuit (IC) process sequences, such as the Complementary Metal-Oxide Semiconductor (CMOS) technique, and the micromechanical components are fabricated using compatible micromachining processes that selectively etch away portions of the silicon wafer or add new structural layers to form the mechanical and electromechanical devices. Those skilled in the art will readily appreciate that fabricating this invention's RFID tag devices with MEMS technology along with the RFID tag circuit at the same time, allows making the devices at a relatively low cost. This invention's conductive bridges can be easily made with a thin metal film deposited on a backing material such as poly-silicon, which is commonly used in MEMS fabrication process. And with MEMS technology, many bridges can be made without difficulty so that the range of the maximum humidity excursion can be recorded with a fine resolution of humidity. An MEMS humidity-sensitive cutoff fuse RFID tag structure 40 showing the bimorph strip with only an upper bridge that is fabricated using MEMS technology is depicted in FIG. 5.

Figure 5:
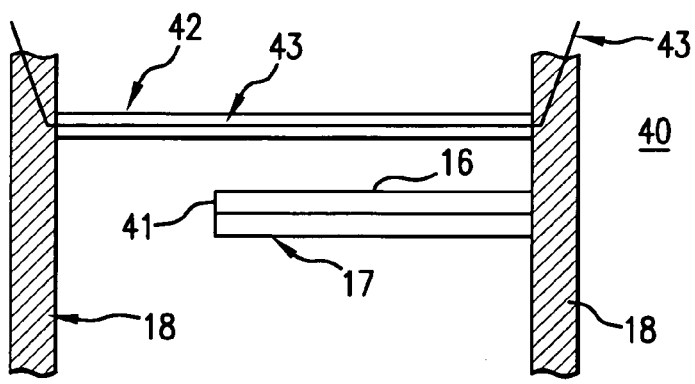
FIG. 5 is an enlarged front view of a bimorph strip and upper conductive bridge of the present invention.

Referring now to FIG. 5, there is depicted an enlarged side view of an MEMS humidity-sensitive cutoff fuse RFID tag 40, comprising a bimorph strip 41, top layer 16, bottom layer 17, a conductive bridge 42, bimorph support arm 18, and a thin metal film 43 deposited on the conductive bridge 42 using MEMS technology. In this embodiment, the conductive bridge 42 may be composed of a backing material such as poly-silicon. This embodiment would also generally include multiple conductive bridges.

Figure 6:
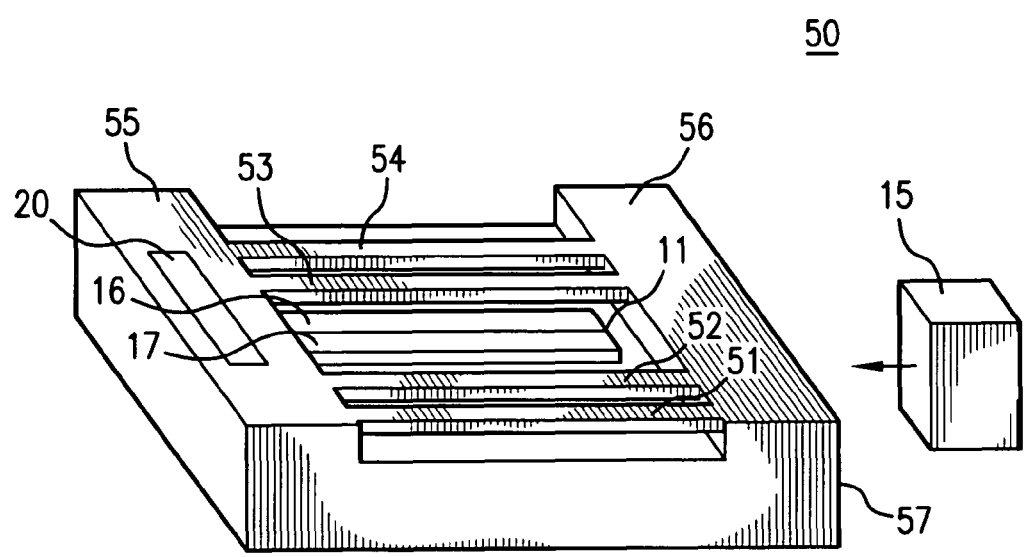
FIG. 6 is a perspective view of another embodiment of the humidity-sensitive cutoff fuse RFID tag of the present invention with multiple conductive bridges.

Another embodiment of this invention's passive humidity-sensitive cutoff fuse RFID tag is depicted in FIG. 6, where the humidity-sensitive cutoff fuse RFID tag 50 is shown in a conceptual perspective view with multiple conductive bridge structures to provide more monitored humidity levels. Referring now to FIG. 6, using the same numerals for like structural elements, there is depicted this invention's multiple bridge humidity-sensitive cutoff fuse RFID tag 50, comprising a bimorph strip 11 and a plurality of thin conductive bridges 51, 52, 53 and 54 positioned on a tag substrate 57 that are held in place by bridge support arms 55 and 56.

This perspective view more clearly illustrates a portion of substrate 57 that has been etched away to allow for more freedom of movement for the bimorph strip 11. The tag 50 is deployed in proximity to a sensor 15. In operation, the bimorph strip 11 reacts to changes in storage humidity conditions and causes a detectable open circuit. This invention's bimorph strip 11 is held in place on tag substrate 57 by one of the bridge support arms 55. Each of the thin conductive bridges 51, 52, 53 and 54 are connected to a conductive bridge fuse circuit 20. In operation, the bimorph strip 11 is configured and positioned on the tag substrate 57 so that when the bimorph strip 11 bends in response to a predetermined humidity level, the bimorph strip 11 breaks one of the conductive bridges 51, 52, 53 and 54, and opens the conductive bridge fuse circuit 20. Thus when RFID tag 50 is interrogated by sensor 15, the RFID tag 50 will indicate the shorted or open status of the conductive bridge fuse circuit 20. The conductive bridges 51, 52, 53 and 54 are depicted as being flush with the upper surfaces of bridge support arms 55 and 56.

The present invention also contemplates a passive humidity-sensitive cutoff fuse RFID tag system, comprising various embodiments of the RFID tag and sensor. Many of the variations of the RFID tag embodiments also apply to the RFID tag system embodiments.

The present invention also encompasses methods for notifying a user when predetermined humidity levels for a group of stored objects have been reached with a passive humidity-sensitive cutoff fuse RFID tag, comprising the steps of selecting a plurality of different materials that exhibit a difference in coefficients of humidity expansion; forming a bimorph strip with two layers composed of two different materials selected from the plurality of different materials because the difference in coefficients of humidity expansion causes the bimorph strip to bend in a first given direction when a first one of the layers is exposed to a first of a plurality of predetermined humidity levels and in an opposite direction when a second one of the layers is exposed to a second of the plurality of predetermined humidity levels; positioning the bimorph strip on a tag substrate; forming a group of thin conductive bridges on the tag substrate in proximity to the bimorph strip; configuring the thin conductive bridges to be broken by the bimorph strip bending after at least one of the plurality of predetermined humidity levels has been reached; and connecting the thin conductive bridges to form a conductive bridge fuse circuit. The method continues with the steps of deploying the RFID tag among stored objects located in the vicinity of a sensor; breaking one of the thin conductive bridges with the bimorph strip when at least one of the plurality of predetermined humidity levels is reached; causing the conductive bridge fuse circuit to become an open circuit detectable by the sensor; and interrogating the RFID tag with the sensor to detect the open circuit. Many of the variations of the RFID tag and tag system embodiments also apply to this invention's methods.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements, and dimensions can achieve the results described herein, without departing from the spirit and scope of this invention. Accordingly, the present invention should not be limited by the foregoing description, but only by the appended claims.

What I claim is:

1. A passive humidity-sensitive cutoff fuse Radio Frequency Identification (RFID) tag requiring no internal power, comprising:
    a bimorph strip is constructed from two layers composed of two different materials;
    said bimorph strip is positioned on a tag substrate;
    a plurality of thin conductive bridges, being positioned on said tag substrate in proximity to and apart from said bimorph strip, are connected to form a one-time breakable nonresetable fusible link conductive bridge fuse circuit having no internal power and which is normally closed;
    each of said plurality of thin conductive bridges corresponding to a single humidity set point, and at least one of said thin conductive bridge has at least one notch to provide easy breakage of the conductive bridge fuse circuit;
    said two different materials having a difference in coefficients of humidity expansion so that said bimorph strip bends in a first given direction when a first one of said layers is exposed to a first one of a plurality of predetermined set point humidity levels and in an opposite direction when a second one of said layers is exposed to a second one of said plurality of predetermined set point humidity levels;
    said plurality of thin conductive bridges being configured to be physically broken by said bimorph strip bending after at least one of said plurality of predetermined set point humidity levels has been reached;
    said RFID tag being positioned among a plurality of stored objects that are located in the vicinity of a sensor; and
    said bimorph strip breaking at least one of said plurality of thin conductive bridges when said at least one of the plurality of predetermined set point humidity levels is reached to cause said conductive bridge fuse circuit to become an open one-time broken nonresetable circuit detectable by said sensor, and a plurality of broken thin conductive bridges provide the user with a record of reaching said plurality of predetermined set point humidity levels.

2. The passive humidity-sensitive cutoff fuse RFID tag, as recited in claim 1, further comprising said bimorph strip being held in place on said tag substrate by a bimorph support arm.

3. The passive humidity-sensitive cutoff fuse RFID tag, as recited in claim 2, further comprising said plurality of thin conductive bridges being held in place by a pair of flexible bridge support members.

4. The passive humidity-sensitive cutoff fuse RFID tag, as recited in claim 3, further comprising said plurality of predetermined humidity levels including a low humidity level.

5. The passive humidity-sensitive cutoff fuse RFID tag, as recited in claim 3, further comprising:
    said plurality of thin conductive bridges being more than two conductive bridges positioned to identify said plurality of predetermined humidity levels; and
    said plurality of predetermined humidity levels being selected from the group of humidity levels consisting of absolute humidity, relative humidity and both absolute humidity and relative humidity.

6. The passive humidity-sensitive cutoff fuse RFID tag, as recited in claim 5, wherein said two different materials are metals.

7. The passive humidity-sensitive cutoff fuse RFID tag, as recited in claim 6, further comprising etching away a portion of said tag substrate to allow freer movement of said bimorph strip.

8. A passive humidity-sensitive cutoff fuse Radio Frequency Identification (RFID) tag system, the tag requiring no internal power, comprising:
    a bimorph strip is constructed from two layers composed of two different materials;
    said bimorph strip is positioned on a tag substrate;
    a plurality of thin conductive bridges, being positioned on said tag substrate in proximity to and apart from said bimorph strip, are connected to form a one-time breakable nonresetable fusible link conductive bridge fuse circuit having no internal power and which is normally closed;
    each of said plurality of thin conductive bridges corresponding to a single humidity set point, and at least one of said thin conductive bridge has at least one notch to provide easy breakage of the conductive bridge fuse circuit;
    said two different materials having a difference in coefficients of humidity expansion so that said bimorph strip bends in a first given direction when a first one of said layers is exposed to a first one of a plurality of predetermined set point humidity levels and in an opposite direction when a second one of said layers is exposed to a second one of said plurality of predetermined set point humidity levels;
    said bimorph strip being held in place on said tag substrate by a bimorph support arm;
    said plurality of thin conductive bridges being configured to be physically broken by said bimorph strip bending after at least one of said plurality of predetermined set point humidity levels has been reached;
    said RFID tag being positioned among a plurality of stored objects that are located in the vicinity of a sensor; and
    said bimorph strip breaking at least one of said plurality of thin conductive bridges when said at least one of the plurality of predetermined set point humidity levels is reached to cause said conductive bridge fuse circuit to become an open one-time broken nonresetable circuit detectable by said sensor, and a plurality of broken thin conductive bridges provide the user with a record of reaching said plurality of predetermined set point humidity levels.

9. The passive humidity-sensitive cutoff fuse RFID tag system, as recited in claim 8, further comprising said plurality of predetermined humidity levels including a low humidity level.

10. The passive humidity-sensitive cutoff fuse RFID tag system, as recited in claim 9, further comprising:
    said plurality of thin conductive bridges being more than two conductive bridges positioned to identify said plurality of predetermined humidity levels; and said plurality of predetermined humidity levels being selected from the group of humidity levels consisting of absolute humidity, relative humidity and both absolute humidity and relative humidity.

11. The passive humidity-sensitive cutoff fuse RFID tag system, as recited in claim 10, wherein said two different materials are metals.

12. The passive humidity-sensitive cutoff fuse RFID tag system, as recited in claim 11, further comprising said RFID tag being constructed with Micro-Electro-Mechanical Systems (MEMS) technology.

13. The passive humidity-sensitive cutoff fuse RFID tag, as recited in claim 12, further comprising etching away a portion of said tag substrate to allow freer movement of said bimorph strip.

14. A method for notifying a user when a plurality of predetermined humidity levels for a plurality of stored objects have been reached with a passive humidity-sensitive cutoff fuse RFID tag requiring no internal power, comprising the steps of:
  selecting a plurality of different materials that exhibit a difference in coefficients of humidity expansion;
  forming a bimorph strip with two layers composed of two different materials selected from said plurality of different materials, said difference in coefficients of humidity expansion causing said bimorph strip to bend in a first given direction when a first one of said layers is exposed to a first one of a plurality of predetermined humidity levels and in an opposite direction when a second one of said layers is exposed to a second one of said plurality of predetermined humidity levels;
  positioning said bimorph strip on a tag substrate;
  forming a plurality of thin conductive bridges on said tag substrate in proximity to and apart from said bimorph strip;
  each of said plurality of thin conductive bridges corresponding to a single humidity set point, and at least one of said thin conductive bridge has at least one notch to provide easy breakage of the conductive bridge fuse circuit;
  configuring said plurality of thin conductive bridges to be physically broken by said bimorph strip bending after at least one of said plurality of predetermined set point humidity levels has been reached;
  connecting said plurality of thin conductive bridges to form a one-time breakable nonresetable fusible link conductive bridge fuse circuit having no internal power and which is normally closed;
  deploying said RFID tag among said plurality of stored objects located in the vicinity of a sensor;
  breaking one of said plurality of thin conductive bridges with said bimorph strip when said at least one of the plurality of predetermined set point humidity levels is reached;
  causing said conductive bridge fuse circuit to become an open one-time broken nonresetable circuit detectable by said sensor;
  interrogating said RFID tag with said sensor to detect said open circuit; and
  providing a plurality of broken thin conductive bridges for the user to record reaching said plurality of predetermined set point humidity levels.

15. The method for rapidly notifying a user when the plurality of predetermined humidity levels has been reached with the passive humidity-sensitive cutoff fuse RFID tag, as recited in claim 14, further comprising the step of holding said bimorph strip in place on said tag substrate by a bimorph support arm.

16. The method for rapidly notifying a user when the plurality of predetermined humidity levels has been reached with the passive humidity-sensitive cutoff fuse RFID tag, as recited in claim 15, further comprising the steps of:
  securing said plurality of thin conductive bridges with a group of flexible bridge support members;
  providing more than two conductive bridges for said plurality of thin conductive bridges; and
  selecting said plurality of predetermined humidity levels from the group of humidity levels consisting of absolute humidity, relative humidity and both absolute humidity and relative humidity.

17. The method for rapidly notifying a user when the plurality of predetermined humidity levels has been reached with the passive humidity-sensitive cutoff fuse RFID tag, as recited in claim 16, wherein said plurality of predetermined humidity levels includes a humidity lower than room humidity.

18. The method for rapidly notifying a user when the plurality of predetermined humidity levels has been reached with the passive humidity-sensitive cutoff fuse RFID tag, as recited in claim 14, further comprising the step of etching away a portion of said tag substrate to allow freer movement of said bimorph strip.

19. The method for rapidly notifying a user when the plurality of predetermined humidity levels has been reached with the passive humidity-sensitive cutoff fuse RFID tag, as recited in claim 18, further comprising the step of constructing said RFID tag with Micro-Electro-Mechanical Systems (MEMS) technology.

20. The method for rapidly notifying a user when the plurality of predetermined humidity levels has been reached with the passive humidity-sensitive cutoff fuse RFID tag, as recited in claim 14, wherein said two different materials are metals.

* * * * *